United States Patent
Joshi et al.

(10) Patent No.: US 9,762,846 B2
(45) Date of Patent: Sep. 12, 2017

(54) REAL-TIME HYPER-LAPSE VIDEO CREATION VIA FRAME SELECTION

(71) Applicant: Microsoft Technology Licensing, LLC, Redmond, WA (US)

(72) Inventors: Neel Suresh Joshi, Seattle, WA (US); Wolf Kienzle, Bellevue, WA (US); Michael A. Toelle, Bellevue, WA (US); Matthieu Uyttendaele, Seattle, WA (US); Michael F. Cohen, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 43 days.

(21) Appl. No.: 14/708,154

(22) Filed: May 8, 2015

(65) Prior Publication Data

US 2016/0330399 A1   Nov. 10, 2016

(51) Int. Cl.
| | |
|---|---|
| *H04N 5/77* | (2006.01) |
| *G11B 27/02* | (2006.01) |
| *G06T 7/00* | (2017.01) |
| *H04N 5/232* | (2006.01) |
| *H04N 5/262* | (2006.01) |
| *H04N 5/783* | (2006.01) |
| *G06T 7/246* | (2017.01) |

(52) U.S. Cl.
CPC ............ *H04N 5/77* (2013.01); *G06T 7/00* (2013.01); *G06T 7/246* (2017.01); *G11B 27/02* (2013.01); *H04N 5/23267* (2013.01); *H04N 5/262* (2013.01); *H04N 5/783* (2013.01); *G06T 2207/10016* (2013.01); *G06T 2207/30244* (2013.01)

(58) Field of Classification Search
None
See application file for complete search history.

(56) References Cited

U.S. PATENT DOCUMENTS

| | | | |
|---|---|---|---|
| 4,615,590 | A | 10/1986 | Alvarez et al. |
| 5,430,480 | A | 7/1995 | Allen et al. |
| 5,909,242 | A | 6/1999 | Kobayashi et al. |
| 7,852,370 | B2 | 12/2010 | Peleg et al. |

(Continued)

OTHER PUBLICATIONS

Bennett, et al., "Computational Time-Lapse Video", In ACM Transactions on Graphics, vol. 26, No. 3, Jul. I, 2007, pp. 1-6.*

(Continued)

*Primary Examiner* — Heather Jones
(74) *Attorney, Agent, or Firm* — Medley, Behrens & Lewis, LLC

(57) ABSTRACT

Various technologies described herein pertain to creation of an output hyper-lapse video from an input video. Values indicative of overlaps between pairs of frames in the input video are computed. A value indicative of an overlap between a pair of frames can be computed based on a sparse set of points from each of the frames in the pair. Moreover, a subset of the frames from the input video are selected based on the values of the overlaps between the pairs of the frames in the input video and a target frame speed-up rate. Further, the output hyper-lapse video is generated based on the subset of the frames. The output hyper-lapse video can be generated without a remainder of the frames of the input video other than the subset of the frames.

20 Claims, 9 Drawing Sheets

(56) References Cited

U.S. PATENT DOCUMENTS

| | | | |
|---|---|---|---|
| 8,311,277 | B2 | 11/2012 | Peleg et al. |
| 8,593,506 | B2 | 11/2013 | Peleg et al. |
| 8,830,360 | B1 | 9/2014 | Burt et al. |
| 8,872,928 | B2 | 10/2014 | Jin et al. |
| 2010/0111489 | A1 | 5/2010 | Presler |
| 2012/0242794 | A1 | 9/2012 | Park et al. |
| 2013/0215239 | A1 | 8/2013 | Wang et al. |
| 2013/0250053 | A1 | 9/2013 | Levy |
| 2014/0105564 | A1 | 4/2014 | Johar |
| 2016/0163022 | A1* | 6/2016 | Peleg ............... G11B 27/00 382/294 |

OTHER PUBLICATIONS

"International Search Report and Written Opinion for PCT Patent Application No. PCT/US2016/026306", Mailed Date: Jul. 8, 2016, 14 pages.

Bennett, et al., "Computational Time-Lapse Video", In ACM Transactions on Graphics, vol. 26, No. 3, Jul. 1, 2007, pp. 1-6.

Lee, et al., "Iterative Key Frame Selection in the Rate-Constraint Environment", In Signal Processing: Image Communication, vol. 18, No. 1, Jan. 1, 2003, pp. 1-15.

Fadaeieslam, et al., "Efficient Key Frames Selection for Panorama Generation From Video", In Journal of Electronic Imaging, Jun. 8, 2011, pp. 023015-1-023015-10.

Poleg, et al., "EgoSampling: Fast-Forward and Stereo for Egocentric Videos", Retrieved At: <<http://arxiv.org/pdf/1412.3596v1.pdf>>, Dec. 11, 2014, 9 pages.

Arev, et al., "Automatic Editing of Footage from Multiple Social Cameras", In Journal of ACM Transactions on Graphics, vol. 33, Issue 4, Jul. 2014, 11 pages.

Baker, et al., "Removing Rolling Shutter Wobble", In Proceedings of the IEEE Conference on Computer Vision and Pattern Recognition, Jun. 2010, 8 pages.

"EF Lens Work III", Retrieved on: Mar. 29, 2015, Retrieved at: <<http://www.amazon.com/Lens-Work-III-The-Eyes/dp/B0000AM6UV>>, 3 pages.

Fischler, et al., "Random Sample Consensus: A Paradigm for Model Fitting with Applications to Image Analysis and Automated Cartography", In Magazine of Communications of the ACM, vol. 24, Issue 6, Jun. 1981, pp. 381-395.

Forssen, et al., "Rectifying Rolling Shutter Video from Hand-Held Devices", In Proceedings of IEEE Conference on Computer Vision and Pattern Recognition, Jun. 13, 2010, pp. 507-514.

Grundmann, et al., "Auto Directed Video Stabilization with Robust L1 Optimal Camera Paths", In Proceedings of IEEE Conference on Computer Vision and Pattern Recognition, Jun. 20, 2011, pp. 225-232.

Joshi, et al., "Image Deblurring Using Inertial Measurement Sensors", In Journal of ACM Transactions on Graphics, vol. 29, Issue 4, Jul. 2010, 8 pages.

Joshi, et al., "Interactively Stylizing Camera Motion", In Proceedings of the SIGCHI Conference on Human Factors in Computing Systems, Apr. 26, 2014, 4 pages.

Karpenko, et al., "Digital Video Stabilization and Rolling Shutter Correction Using Gyroscopes", In Technical Report CSTR 2011-03, Sep. 2011, 1 page.

Karpenko, Alex, "The Technology Behind Hyperlapse from Instagram", Retrieved on: Mar. 29, 2015, Retrieved at: <<http://instagram-engineering.tumblr.com/post/95922900787/hyperlapse>>, 8 pages.

Kopf, et al., "First-Person Hyper-Lapse Videos", In Proceedings of 41st International Conference on Computer Graphics and Interactive Techniques, Aug. 10, 2014, 10 pages.

Liu, et al., "Content-Preserving Warps for 3D Video Stabilization", In Journal of ACM Transactions on Graphics, vol. 28, Issue 3, Jul. 2009, 10 pages.

Liu, et al., "Subspace Video Stabilization", In Journal of ACM Transactions on Graphics, vol. 30, Issue 1, Jan. 2011, 10 pages.

Liu, et al., "Bundled Camera Paths for Video Stabilization", In Journal of ACM Transactions on Graphics, vol. 32, Issue 4, Jul. 2013, 10 pages.

Matsushita, et al., "Full-Frame Video Stabilization with Motion Inpainting", In Journal of IEEE Transactions on Pattern Analysis and Machine Intelligence, vol. 28, Issue 7, Jul. 2006, 14 pages.

Provost, Dan, "How Does the iOS 8 Time-Lapse Feature Work?", Published on: Sep. 23, 2014, Available at: <<http://www.studioneat.com/blogs/main/15467765-how-does-the-ios-8-time-lapse-feature-work>>, 6 pages.

Schödl, et al., "Video Textures", In Proceedings of the 27th Annual Conference on Computer Graphics and Interactive Techniques, Jul. 1, 2000, 10 pages.

Wang, et al., "VideoSnapping: Interactive Synchronization of Multiple Videos", In Journal of ACM Transactions on Graphics, vol. 33, Issue 4, Jul. 2014, 10 pages.

Poleg, et al., "EgoSampling: Fast-Forward and Stereo for Egocentric Videos", arXiv preprint arXiv:1412.3596, 2014, 9 pages.

Karpenko, Alex, "The Technology behind Hyperlapse from Instagram—Instagram Engineering", Published on: Aug. 27, 2014, Available at: <<http://instagram-engineering.tumblr.com/post/95922900787/hyperlapse>>, 10 pages.

"Genie—Syrp", Published on: Mar. 16, 2015, Available at: <<https://syrp.co.nz/products/genie>>, 13 pages.

Isikdogan, Furkan., "UTIMELAPSE: A Tool for Creating High Quality Timelapse Videos", Published on: May 2014, Available at: <<http://www.isikdogan.com/files/Isikdogan_EE381V_2014_Project_Report.pdf>>, 4 pages.

"Response to the International Search Report and Written Opinion for PCT Patent Application No. PCT/US2016/026306", Filed Date: Oct. 21, 2016, 14 pages.

"International Preliminary Report on Patentability for PCT Patent Application No. PCT/US2016/026306", Mailed Date: Feb. 15, 2017, 7 pages.

"International Preliminary Report on Patentability for PCT Patent Application No. PCT/US2016/026306", dated May 15, 2017, 23 pages.

* cited by examiner

REAL-TIME HYPER-LAPSE VIDEO CREATION VIA FRAME SELECTION

BACKGROUND

The proliferation of video cameras along with increasing support for video sharing has resulted in escalating numbers of videos being captured. While increasingly plentiful storage allows for recording videos having longer durations, it is often tedious to view and navigate such videos, as users typically do not have time or patience to sift through minutes of unedited footage. A conventional technique to reduce the burden of watching long videos is to speed up such videos by creating time-lapse videos.

A time-lapse video can be played at a speed faster than real-time; thus, when played, time appears to be moving faster and thus lapsing. For example, an image of a scene may be captured once per second (e.g., recording only one frame per second), then played back at 30 frames per second; the resulting time-lapse video can have an apparent 30 times speed increase. According to another example, a video of the scene may be captured (at a given frame rate such as 30 frames per second) and all but one frame each second can be dropped; if the resulting video is played back at 30 frames per second, again the resulting time-lapse video can have an apparent 30 times speed increase.

When video is captured with a stationary camera, time-lapse videos are commonly effective; however, if a video is captured with a moving camera, the speed-up process accentuates apparent motion, resulting in a distracting and difficult to watch time-lapse video. Hyper-lapse videos are an emerging medium that addresses the difficulty of time-lapse videos captured with moving cameras by performing camera motion smoothing, or stabilization, in addition to the speed-up process. However, creating a hyper-lapse video by skipping all but every Xth frame (where X can be substantially any integer) can result in frames that are difficult to align; thus, even when stabilization techniques are applied to such frames, significant motion due to movement of the camera can remain in the resulting hyper-lapse video, thereby degrading the quality of the resulting hyper-lapse video.

SUMMARY

Described herein are various technologies that pertain to creation of an output hyper-lapse video from an input video. Values indicative of overlaps between pairs of frames in the input video can be computed. A value indicative of an overlap between a pair of frames can be computed based on a sparse set of points from each of the frames in the pair. Moreover, a subset of the frames from the input video can be selected. The subset of the frames can be selected based on the values of the overlaps between the pairs of the frames in the input video and a target frame speed-up rate. The target frame speed-up rate can specify a value of X such that every Xth frame of the input video is desirably selected and remaining frames of the input video are desirably skipped. Further, the target frame speed-up rate can differ from an actual frame speed-up rate over at least a portion of the subset of the frames selected from the input video. Further, the output hyper-lapse video can be generated based on the subset of the frames. The output hyper-lapse video can be generated without a remainder of the frames of the input video other than the subset of the frames.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
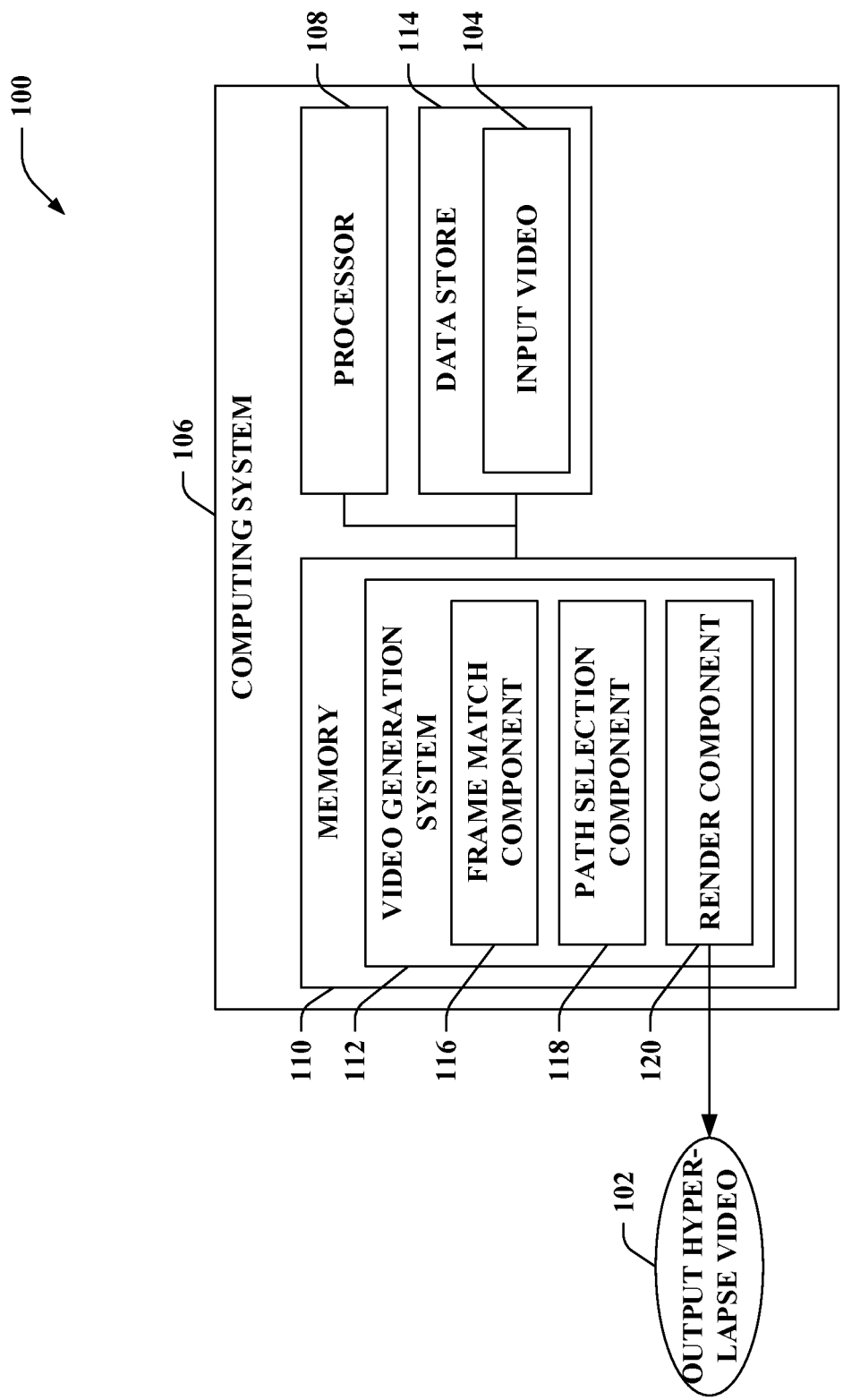
FIG. 1 illustrates a functional block diagram of an exemplary system that generates an output hyper-lapse video from an input video.

Various technologies pertaining to creating an output hyper-lapse video from an input video are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Referring now to the drawings, FIG. 1 illustrates a system 100 that generates an output hyper-lapse video 102 from an input video 104. The system 100 includes a computing system 106. The computing system 106 includes at least one processor 108 and memory 110. The processor 108 is configured to execute instructions loaded into the memory 110 (e.g., one or more systems loaded into the memory 110 are executable by the processor 108, one or more components loaded into the memory 110 are executable by the processor 108, etc.). As described in greater detail herein, the memory 110 includes a video generation system 112 configured to create the output hyper-lapse video 102 from the input video 104, where the video generation system 112 is executable by the processor 108; thus, the memory 110 includes instructions configured to generate the output hyper-lapse video 102.

According to various examples, the computing system 106 can be or include a computing device. Pursuant to various illustrations, the computing device can be a desktop computing device, a mobile computing device (e.g., a laptop computing device, a mobile telephone, a smartphone, a tablet computing device, a wearable computing device, a handheld computing device, a portable gaming device, a personal digital assistance, a camera, etc.), a gaming console, an in-vehicle communications and infotainment system, or the like. In accordance with other examples, the computing system 106 can be or include one or more server computing devices. For instance, the computing system 106 can be or include one or more datacenters, where a datacenter includes a plurality of server computing devices. Additionally or alternatively, the computing system 106 can be a distributed computing system.

Moreover, the computing system 106 can include a data store 114. The data store 114 can retain the input video 104. The input video 104 includes a sequence of frames $F = \langle 1, 2, \ldots, T \rangle$. Although not shown, it is contemplated that the data store 114 can further retain the output hyper-lapse video 102 created by the video generation system 112.

The video generation system 112 is configured to execute an algorithm for creating the output hyper-lapse video 102. The video generation system 112 can generate the output hyper-lapse video 102 while mitigating detrimental impact of high-frequency camera motion (of a camera during capture of the input video 104). The video generation system 112 need not use sensor data other than the input video 104 to generate the output hyper-lapse video 102; thus, the video generation system 112 can create output hyper-lapse videos based on input videos captured by substantially any camera. Further, the video generation system 112 can create the output hyper-lapse video 102 in real-time (e.g., 30 frames per second (FPS) on a mobile computing device, faster than 30 FPS on a desktop computing device, etc.).

The video generation system 112 can create output hyper-lapse videos at substantially any frame speed-up rate. Moreover, the video generation system 112 is not constrained by a type of video camera used to capture the input video 104, scene content, or camera motion. For instance, the input video 104 can be captured by the computing system 106 (e.g., using an image sensor of the computing system 106) or received directly or indirectly from a disparate computing system (e.g., the disparate computing system can include an image sensor that can capture the input video 104).

Traditional hyper-lapse algorithms may generate satisfactory hyper-lapse videos for input videos having smooth input camera motions. However, when the input camera is subjected to high-frequency motion during capture of an input video, the resulting output hyper-lapse video generated by conventional approaches can be unwatchable. Naïvely picking frames from an input video captured by a camera subjected to high-frequency motion can result in choosing frames that have minimal or no overlap; thus, the frames chosen via traditional techniques may be unable to be aligned when stabilizing such frames, thereby impacting an ability to smooth a resulting output hyper-lapse video. However, the high-frequency motion of the camera may be repeatable (e.g., due to hand shaking, walking, running, head motions, etc.). In contrast to various conventional approaches, the video generation system 112 can select a subset of the frames of an input video 104 from which the output hyper-lapse video 102 can be generated based on overlaps between pairs of frames in addition to a target frame speed-up rate.

The video generation system 112 can use feature tracking techniques to recover two dimensional (2D) camera motion. In contrast to conventional approaches, the video generation system 112 can jointly optimize camera motion smoothing and speed up. The video generation system 112 can employ a dynamic programming algorithm that selects a subset of frames from the input video 104 that approximate a desired target frame speed-up rate and smooth possible camera motion in the output hyper-lapse video 102. Once the subset of the frames is selected by the video generation system 112, 2D video stabilization can be executed to create a smoothed camera path from which the output hyper-lapse video 102 can be rendered.

The video generation system 112 can include a frame match component 116 configured to compute values indicative of overlaps between pairs of frames in the input video 104. A value indicative of an overlap between a pair of frames can be computed by the frame match component 116 based on a sparse set of points from each of the frames in the pair. The sparse set of points from each of the frames in the pair can include a center point from each of the frames in the pair. However, it is to be appreciated that the sparse set of points from each of the frames in the pair can include other points from such frames in addition to or instead of the center point. Moreover, the frame match component 116 can further be configured to compute the value indicative of the overlap between the pair of frames based on movement of the sparse set of points between the frames in the pair.

The frame match component 116 can use sparse feature-based techniques to estimate how well each frame can be aligned to its temporal neighbors. More particularly, the frame match component 116 can be configured to compute feature-based transformations between pairs of frames in the input video 104. The frame match component 116 can further be configured to align the pairs of the frames based on the feature-based transformations. Moreover, the frame match component 116 can compute the values indicative of the overlaps between the pairs of the frames in the input video 104 as aligned (e.g., based on the sparse sets of points from the frames in the pairs as aligned).

The video generation system 112 further includes a path selection component 118 configured to select a subset of the frames from the input video 104. The subset of the frames can be selected by the path selection component 118 based on the values of the overlaps between the pairs of the frames in the input video 104 and a target frame speed-up rate. A dynamic-time-warping (DTW) algorithm can be utilized by the path selection component 118 to find an optimal path of frames that trades-off matching the target frame speed-up rate with minimizing frame-to-frame motion. Accordingly, the path selection component 118 can be configured to select a subset of the frames from the input video 104 that optimize overlaps between adjacent frames in the output hyper-lapse video 102 and costs due to variations from the target frame speed-up rate.

The target frame speed-up rate can specify a value of X such that every Xth frame of the input video 104 is desirably selected and remaining frames of the input video 104 (other than the Xth frames) are desirably skipped. According to an example, X can be an integer value. By way of another example, it is contemplated that X can be non-integral. Moreover, the target frame speed-up rate can differ from an actual frame speed-up rate over at least a portion of the subset of the frames selected from the input video 104 (e.g., the Xth frame after a selected frame can be skipped by the path selection component 118 while a frame other than the Xth frame can be selected by the path selection component 118). By way of illustration, the target frame speed-up rate can be 8 (e.g., specifying that every 8th frame is desirably selected). Following this illustration, the actual frame speed-up rate can differ over at least a portion of the selected frames. For instance, a sequence of frames A, B, C, and D can be selected by the path selection component 118; in the input video 104, the frame B can be the 7th frame after the frame A, the frame C can be the 8th frame after the frame B, and the frame D can be the 10th frame after the frame C. However, it is to be appreciated that the claimed subject matter is not limited to the foregoing illustration.

The path selection component 118 can further be configured to select the subset of the frames from the input video 104 based on an acceleration penalty value that penalizes changes in an actual frame speed-up rate over the subset of the frames selected from the input video 104. Thus, the subset of the frames from the input video 104 can be selected by optimizing overlaps between adjacent frames in the output hyper-lapse video 102, costs due to variations from the target frame speed-up rate, and costs due to changes in the actual frame speed-up rate over the subset of the frames selected from the input video 104. For instance, the acceleration penalty value can penalize changing from an actual frame speed-up rate of 8 to an actual frame speed-up rate of 9. Pursuant to another example, a first acceleration penalty value for changing from an actual frame speed-up rate of 8 to an actual frame speed-up rate of 9 can be less than a second acceleration penalty value for changing from an actual frame speed-up rate of 8 to an actual frame speed-up rate of 10.

The video generation system 112 further includes a render component 120 configured to generate the output hyper-lapse video 102 based on the subset of the frames selected by the path selection component 118. The output hyper-lapse video 102 can be generated without a remainder of the frames of the input video 104 other than the subset of the frames. The render component 120 can be configured to perform video stabilization on the subset of the frames. The render component 120 thus can perform path smoothing and rendering of the output hyper-lapse video 102. Given the selected subset of the frames of the input video 104, the render component 120 can smooth the camera path to produce a stabilized output hyper-lapse video 102. Although not shown, it is contemplated that a graphics processor can additionally or alternatively be used for image warping after selection of the subset of the frames from the input video 104.

There are various conventional approaches for creating time-lapse and hyper-lapse videos. Some conventional techniques perform a time-lapse by naively skipping frames in a video without any stabilization. Other traditional approaches create hyper-lapse videos by performing stabilization and time-lapse sequentially in either order (i.e., first stabilize and then skip frames or skip frames and then stabilize).

Some conventional approaches use hardware-based techniques for stabilizing camera motion (e.g., after skipping frames or before skipping frames). Hardware stabilization of camera motion can use onboard inertial sensors (e.g., gyroscope, accelerometer, etc.) at capture time to obtain sensor data for stabilization; such sensor data can be captured in addition to an input video. The conventional hardware-based approaches often fail to stabilize foreground objects since the sensor data is used for stabilization without utilizing the content of the input video (e.g., the global inertial frame can be stabilized without locking onto moving foreground objects). Further, these conventional techniques cannot be applied to existing videos captured without corresponding sensor data.

Other traditional approaches for stabilizing camera motion are software-based. For instance, software-based computer vision techniques can operate on pixels themselves. Examples include 2D stabilization and full three dimensional (3D) reconstruction and stabilization. Traditional 2D stabilization approaches can work well when camera motion is slow; however, such approaches can breakdown when the camera is subjected to high-frequency motion. 3D reconstruction and stabilization approaches can provide satisfactory results when there is sufficient camera motion and parallax in the scene; however, such 3D reconstruction and stabilization approaches commonly have high computational cost and are prone to tracking and reconstruction errors when there is insufficient camera translation.

In contrast to the foregoing conventional techniques, the video generation system 112 does not rely on inertial sensors and does not naively skip frames. For instance, naïve frame skipping can degrade watchability of a resulting hyper-lapse video since such technique can result in picking frames unable to be satisfactorily stabilized. Instead, the video generation system 112 allows deviations from the target frame speed-up rate if such deviations lead to enhanced smoothing. The video generation system 112 can optimize an energy function that balances matching the target frame speed-up rate and minimizing frame-to-frame motion in the output hyper-lapse video 102. Accordingly, the video generation system 112 can handle high-frequency camera motion with less complexity than traditional 3D reconstruction and stabilization techniques (which can reduce processor load and decrease a duration of time for creation of the output hyper-lapse video 102 in comparison to these traditional 3D approaches).

The video generation system 112 can perform an optimization technique to choose the subset of the frames from the input video 104 that are close to the target frame speed up rate, yet can be aligned and thus stabilized in the sped up output hyper-lapse video 102. An energy function that balances matching the target frame speed-up rate while minimizing frame-to-frame motion can be optimized to choose the subset of the frames, which can be stabilized by the render component 120. Further, the video generation system 112 can handle high-frequency camera motion and can execute in real-time on high-definition video (e.g., the input video 104). Moreover, the video generation system 112 need not utilize sensor data in addition to the input video 104, and thus can create an output hyper-lapse video based on an input video captured on substantially any camera.

Figure 2:
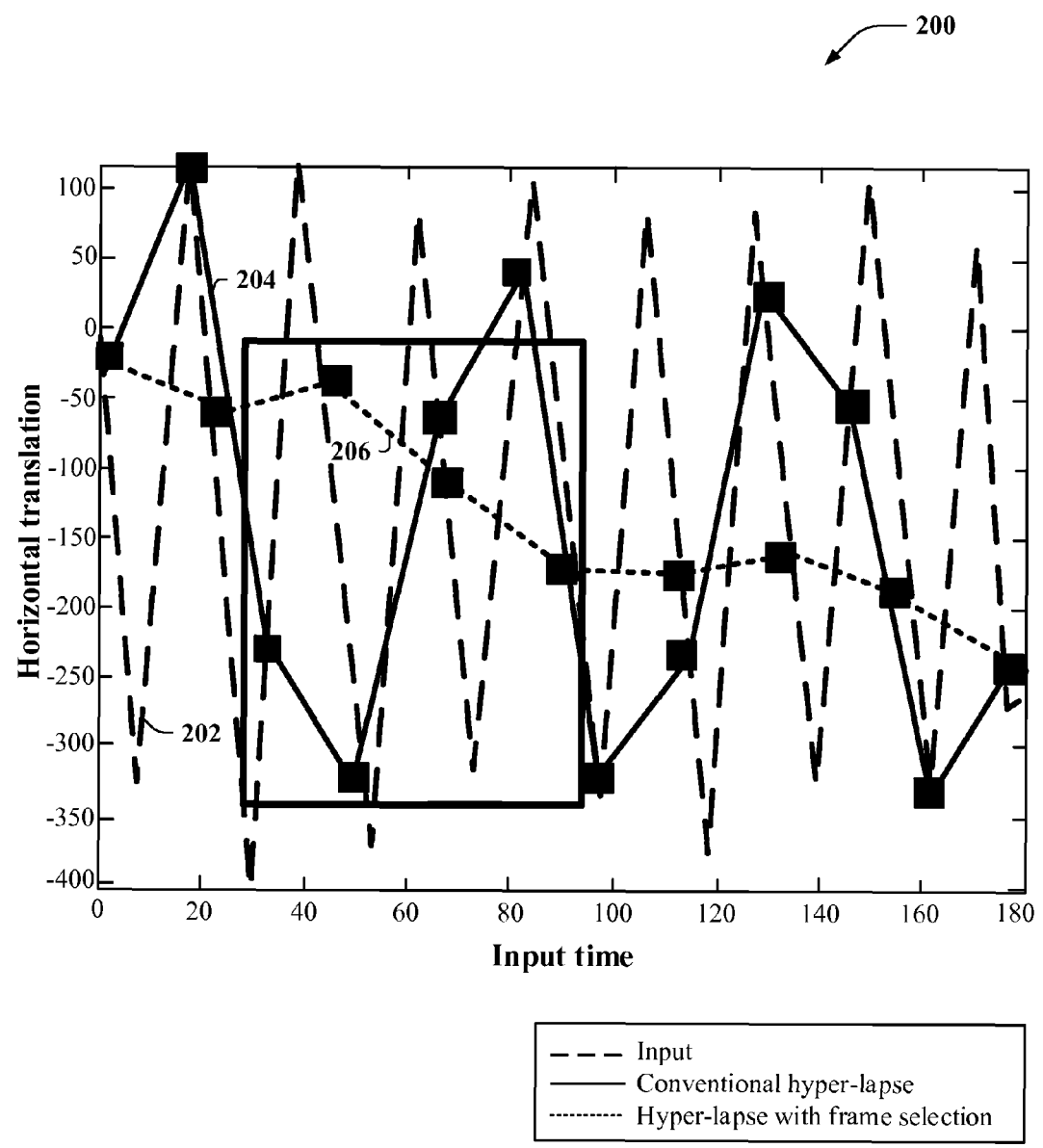
FIG. 2 illustrates an exemplary graph showing a comparison between a conventional naïve hyper-lapse technique and a hyper-lapse approach with frame selection employed by a video generation system as set forth herein.

With reference to FIG. 2, illustrated is an exemplary graph 200 showing a comparison between the conventional naïve hyper-lapse technique and the hyper-lapse approach with frame selection employed by the video generation system 112 as set forth herein. As depicted in FIG. 2, an input video can exhibit significant semi-regular, high-frequency camera motion as represented by dashed line 202 (e.g., showing semi-periodic changes in horizontal translation). The camera motion, for example, can be due to running, walking, head motion, hand-shake, and so forth. As depicted in FIG. 2, a traditional 8× hyper-lapse (where every 8th frame is used and the remaining seven frames are dropped) can result in frames with little overlap that are difficult to align as represented by solid line 204. In contrast, the approach set forth herein allows deviations from the target frame speed-up rate to create output hyper-lapse videos that are smooth, even when there is significant camera motion as represented by dotted line 206. Accordingly, with the semi-periodic horizontal jitter for the input video as represented by the dashed line 202, naïve skipping can choose frames that have less overlap and increased parallax compared to the approach set forth herein that permits deviations from the target frame speed-up rate. Thus, the technique described herein can be used to select frames having less motion there between, resulting in enhanced alignment and a smoother resulting hyper-lapse video.

Figure 3:
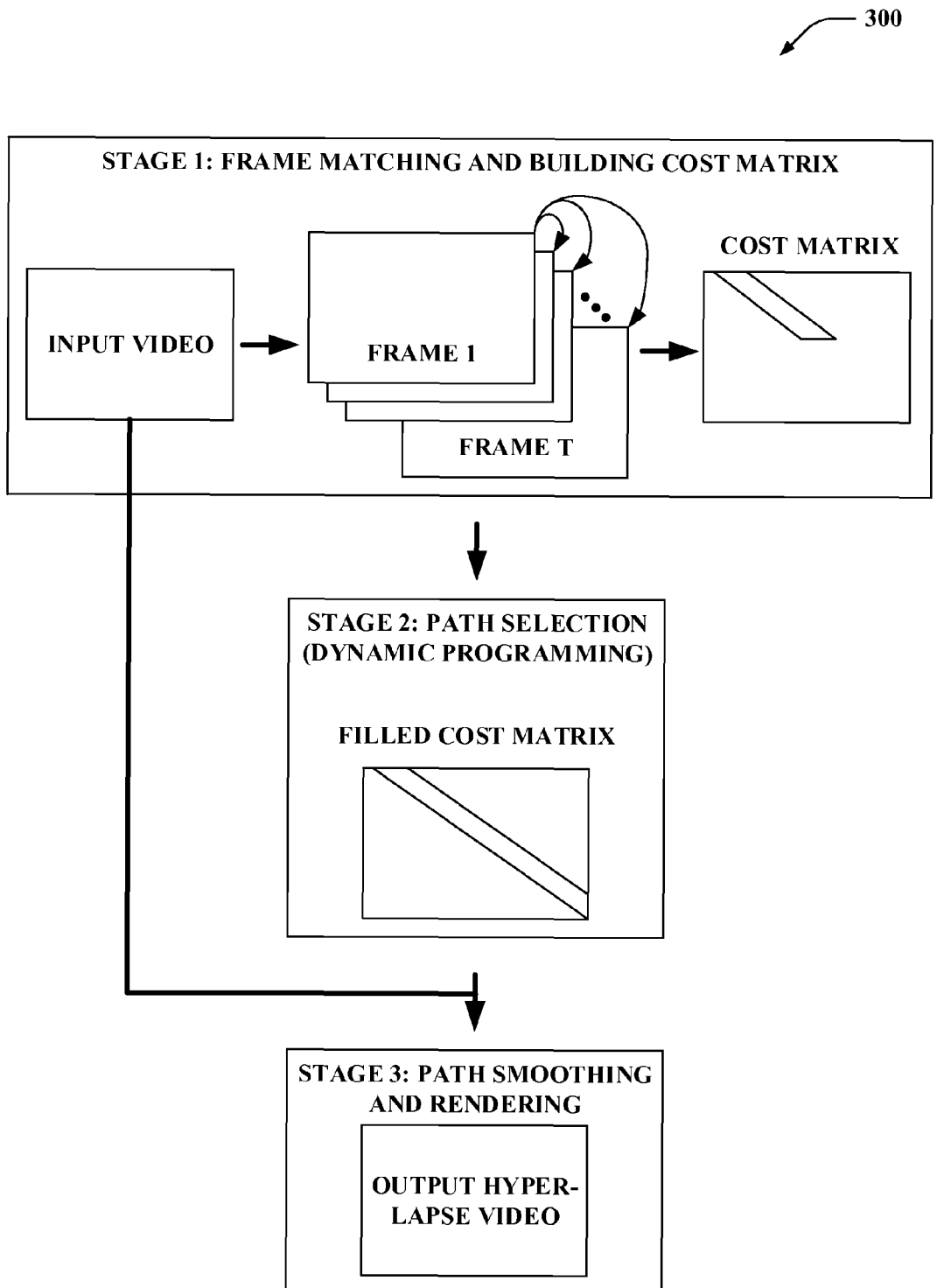
FIG. 3 illustrates exemplary diagram showing creation of the output hyper-lapse video from the input video by the video generation system.

Referring now to FIG. 3, illustrated is an exemplary diagram 300 showing creation of the output hyper-lapse video 102 from the input video 104 by the video generation system 112. As illustrated, the output hyper-lapse video 102 can be created in three stages: a first stage that can be performed by the frame match component 116, a second stage that can be performed by the path selection component 118, and a third stage that can be performed by the render component 120.

As part of stage 1, the frame match component 116 can perform frame matching to build a cost matrix. Sparse feature-based techniques can be employed by the frame match component 116 to evaluate how well each frame can be aligned to its temporal neighbors. As part of stage 2, the path selection component 118 can select a subset of the frames from the input video 104 by employing a dynamic programming algorithm to identify an optimal path of frames that balances matching a target frame speed-up rate and minimizing frame-to-frame motion. As part of stage 3, the render component 120 can generate the output hyper-lapse video 102 by implementing path smoothing and rendering; thus, given the selected subset of the frames from the input video 104, the render component 120 can smooth the camera path and render the output hyper-lapse video 102.

Again, the input video 104 can be represented as a sequence of frames F=⟨1, 2, . . . , T⟩. A time-lapse can be defined as any path p that is a monotonically increasing subsequence of F. The path can inherently serve as a mapping from output time to input time p(t̃)=t, where t∈F.

Moreover, the output hyper-lapse video 102 can have a path p where the time between subsequent frames is close to the target frame speed-up rate yet subsequent frames can be aligned and an overall result can have smooth camera motion. Identification of the path can be formulated as an optimization problem that minimizes a cost function (e.g., an objective function) that includes various terms. For example, the terms can include a cost that drives towards optimal frame transitions, a term that drives towards matching the target frame speed-up rate, and a term that minimizes an acceleration. The cost function can be used to populate a cost matrix, and a path through the matrix can directly correspond to the path p. The path selection component 118 can utilize a dynamic programming approach, where a dynamic-time-warping algorithm can be employed to identify the optimal path.

A desired frame-to-frame transition can be between a pair of frames that can be aligned and have significant overlap. The ability of the frames to be aligned provides a smooth visual transition between the frames, and the overlap allows for the transition to occur with minimal cropping of the frames.

Given two video frames $F_{t=i}$ and $F_{t=j}$, denote transformation T(i,j) as the homography that warps $F_i$ to $F_j$ (note that the "t=" notation is dropped for brevity). Such transformation can map a set of feature points between the frames. The frame match component 116 can be configured to compute the feature-based transformations between pairs of frames in the input video 104. For example, T(i,j) can be computed by the frame match component 116 using a RANSAC (RANdom Sample Consensus) method on sparse feature points.

Accordingly, the frame match component 116 can compute the feature-based transformations between the pairs of the frames in the input video 104. Further, the frame match component 116 can align the pairs of the frames based on the feature-based transformations. Moreover, the frame match component 116 can compute the values indicative of the overlaps between the pairs of the frames in the input video as aligned.

More particularly, given T(i,j), two cost functions corresponding to the aforementioned criteria can be defined for evaluating a frame-to-frame transition.

A first term can be an alignment cost:

$$C_r(i, j) = \frac{1}{n}\sum_{p=1}^{n} \left\| (x_p, y_p)_j^T - T(i, j)(x_p, y_p)_i^T \right\|$$

The alignment cost can be equivalent to an average of the 2D geometric reproduction error for n corresponding features selected by the RANSAC process.

A second term can measure motion and penalize lack of overlap between the frames:

$$C_o(i,j) = \left\| (x_0, y_0)^T - T(i,j)(x_0, y_0)^T \right\|^2$$

In the above, ($x_0$, $y_0$, 1) can be a center of an image. The foregoing can be equivalent to a magnitude of translation of the center of the image between the two frames (e.g., movement of the sparse set of points between frames in a pair), which is a function of the (out-of-plane) rotation and translation of the camera. This can serve as an estimate of motion of a camera look-vector.

Moreover, the alignment cost and the overlap cost can be combined into a single motion cost function:

$$C_m(i, j) = \begin{cases} C_o(i, j) & C_r(i, j) < \tau_c \\ \gamma & C_r(i, j) \geq \tau_c \end{cases}$$

According to an example, $\tau_c = 0.1*d$ and $\gamma = 0.5*d$. Moreover, d is the image diagonal in pixels in the motion cost function. Based on the motion cost function, if the alignment error is relatively low (e.g., less than 10% of the image diagonal in the aforementioned example), the motion cost can be equal to the overlap cost. Alternatively, if the alignment error is relatively large, the transformation and motion costs may be unreliable, so T(i,j) can be set to identity and the cost can be set to a significant cost (e.g., half the diagonal of the image in the aforementioned example), which corresponds to zero image overlap. These cases can be due to abrupt transitions in the input video. The significant cost can cause the optimization to avoid choosing such frame; however, the frame can be chosen if there is no other frame to be selected. The foregoing can ensure that the algorithm can identify a full path through the video.

The above-noted matching costs can enable smoothing the hyper-lapse video in terms of camera motion. However, it is also desirable for the hyper-lapse video to achieve a desired speed-up. Accordingly, a second cost function can penalize straying from an input target frame speed-up rate:

$$C_s(i,j,v) = \min(\|(j-i)-v\|^2, \tau_s)$$

The foregoing term is a truncated $L^2$ on a difference between the actual jump between the frames i and j and the target frame speed-up rate v. According to an example, a setting of $\tau_s=200$ can be utilized; however, it is to be appreciated that the claimed subject matter is not limited to such value of the above-noted parameter.

The costs set forth above can lead to a balance between choosing frames that smooth motion versus violating the target frame speed-up rate. According to an illustration, violating the target frame speed-up rate to achieve smoother camera motion can cause a perceptible visual jump as time suddenly accelerates. Accordingly, an acceleration penalty can be utilized to reduce such effect by making the speed changes more gradual:

$$C_a(h,i,j) = \min(\|(j-i)-(i-h)\|^2, \tau_a)$$

This term is also a truncated $L^2$. Further, a setting of $\tau_a=200$ can be utilized; however, the claimed subject matter is not limited to use of such value of this parameter.

Further, a total cost for a given speed-up rate v for a triplet of frames can be evaluated as follows:

$$C(h,i,j,v) = C_m(i,j) + \lambda_s C_s(i,j,v) + \lambda_a C_a(h,i,j)$$

According to an example, $\lambda_s=200$ and $\lambda_a=80$. However, the claimed subject matter is not limited to use of such values of the foregoing parameters. For instance, such parameters can be varied to balance between matching the target frame speed-up rate and smoothing changes in velocity.

A cost of a path for a particular target frame speed-up rate v can be defined as:

$$\phi(p,v) = \sum_{\tilde{i}=1}^{\tilde{T}-1} C(p(\tilde{i}-1), p(\tilde{i}), p(\tilde{i}+1), v)$$

Moreover, an optimized path p can be identified as follows:

$$p_v = \underset{p}{\operatorname{argmin}} \phi(p,v)$$

In stage 1, the frame match component 116 can compute matching cost using frame matching as described above. Such costs can be stored in a sparse, static cost matrix $C_m$ for all frames $\langle 1, 2, \ldots, T \rangle$. It is noted that the same notation is used herein for the cost function and matrix $C_m$ (e.g., since the cost function is discrete).

An upper triangle of $C_m$ can be constructed as $C_m$ is symmetric. According to an example, $C_m$ can be fully populated to capture the cost of transition between any two frames. According to another example, a banded or windowed version of C can be computed, with band w defining a maximum allowed skip between adjacent frames in the path. Accordingly, pairs of the frames in the input video 104 for which the values indicative of the overlaps are computed can include particular pairs of frames having less than or equal to a maximum permitted frame separation in the input video 104 (e.g., maximum allowed skip between adjacent frames as set by band w) and can exclude remaining pairs of frames having greater than the maximum permitted frame separation in the input video 104. For a particular input video 104 and value of w, $C_m$ is static and computed by the frame match component 116 once and reused for generating any speed up v≤w.

As part of stage 2, the path selection component 118 can employ a dynamic programming (DP) algorithm that can include two passes. The path selection component 118 can execute a first pass of the algorithm to populate a dynamic cost matrix $D_v$, which is a function of a target frame speed-up rate v (e.g., specified based on received input, etc.). While $C_m$ can be computed once in stage 1, the DP algorithm can be executed for each desired speed-up rate. The same window size w can be used for $D_v$ and $C_m$. The algorithm can construct $D_v$ by iterating over its elements, where each entry $D_v(i,j)$ represents a running minimal cost path and ends with the frames i and j. This cost can be a sum of $C_m$, $C_s$, and $C_a$. $C_m$ can be a distance matrix, $C_s$ can be a gap penalty, and $C_a$ can be a second-order penalty. Accordingly, the path selection component 118 can solve for a self-alignment, where a trivial alignment may not be permitted and gaps of certain sizes can be desired. At each step of filling $D_v$, the algorithm can accumulate the cost by evaluating the $C_m$ and $C_s$ cost functions at i and j and finding a lowest cost proceeding frame h, which depends on the previous costs and $C_a$. Moreover, h can be stored in a trace back matrix T for a second pass of the algorithm.

Once D is populated, the path selection component 118 can execute a second pass of the algorithm to identify an optimal path by finding the minimal cost in the final rows and columns of $D_v$ (within some end gap g) and then tracing the path through the matrix. Start gaps and end gaps g can be allowed as the optimization can perform better when not restricted to include the first and last frame. Moreover, for long hyper-lapse sequences, the start and end gaps may not be noticeable in the resulting video. According to an example, g=4 can be used; however, other size gaps can be employed.

The following pseudo code provides an example of the frame selection algorithm that can be executed by the path selection component 118. It is to be appreciated that the exemplary pseudo code is provided for illustration purposes, and the claimed subject matter is not limited to such example.

```
1.   Algorithm: Stage 2: Path Selection
2.   Input: v
3.   Initialization:
4.      for i = 1 to g do
5.         for j = i + 1 to i + w do
6.            D_v(i,j) = C_m(i,j) + λ_s C_s(i,j,v)
7.         end for
8.      end for
9.   First pass: populate D_v
10.     for i = g to T do
11.        for j = i + 1 to i + w do
12.           c = C_m(i,j) + λ_s C_s(i,j,v)
13.
              D_v(i,j) = c + min_{k=1}^{w} [D_v(i-k,i) + λ_a C_a(i-k,i,j)]

14.
              T_v(i,j) = argmin_{k=1}^{w} [D_v(i-k,i) + λ_a C_a(i-k,i,j)]

15.        end for
16.     end for
```

| | |
|---|---|
| 17. | Second pass: trace back min cost path |
| 18. | $(s,d) = \underset{i=T-g, j=i+1}{\operatorname{argmin}} ^{T,i+w} D_v(i,j)$ |
| 19. | p = ⟨ d⟩ |
| 20. | while s > g do |
| 21. | p = prepend(p,s) |
| 22. | b = T_v(s,d) |
| 23. | d = s, s = b |
| 24. | end while |
| 25. | Return: p |

In the foregoing pseudo code, a first pass can populate the dynamic cost matrix D, where each entry $D_v(i,j)$ represents a cost of a minimal cost path that ends at frame t=j. A trace-back matrix T is filled to store the minimal cost predecessor in the path. The optimal minimum cost path can be identified by the path selection component 118 by examining the final rows and columns of D and the final path p can be created by walking through the trace-back matrix.

Once the subset of frames is selected by the path selection component 118, the render component 120 can compute a smooth camera motion path and warp the images to generate the output hyper-lapse video 102. As part of stage 3, the render component 120 can run video stabilization, which can compute a sequence of frame-to-frame transformations and smooth the transformed frames to create a stable result.

The render component 120 can compute an alignment by extracting image features for each frame and performing a search between frames to find matching features. This process implemented by the render component 120 can differ from the process used by the frame match component 116 for frame matching, since tracking across multiple frames can be used to avoid locking onto scene motion. In contrast, the frame match component 116 uses pairs of frames for matching. Accordingly, the render component 120 can distinguish foreground motion from background static features. Moreover, the tracks can be analyzed using a RANSAC method to find a set of inlier tracks such that a single temporal sequence of homographies maps background features to their positions in an initialization frame. If a threshold number (or percentage) of tracks are lost after a number of frames, a tracker can reset with a new set of feature points. The tracking process can result in a sequence of frame-to-frame homographies, which can be smoothed. According to an example, rolling shutter correction can also be performed. Moreover, the render component 120 can warp the frames with the smoothed transformations and corrections to produce the output hyper-lapse video 102.

Figure 4:
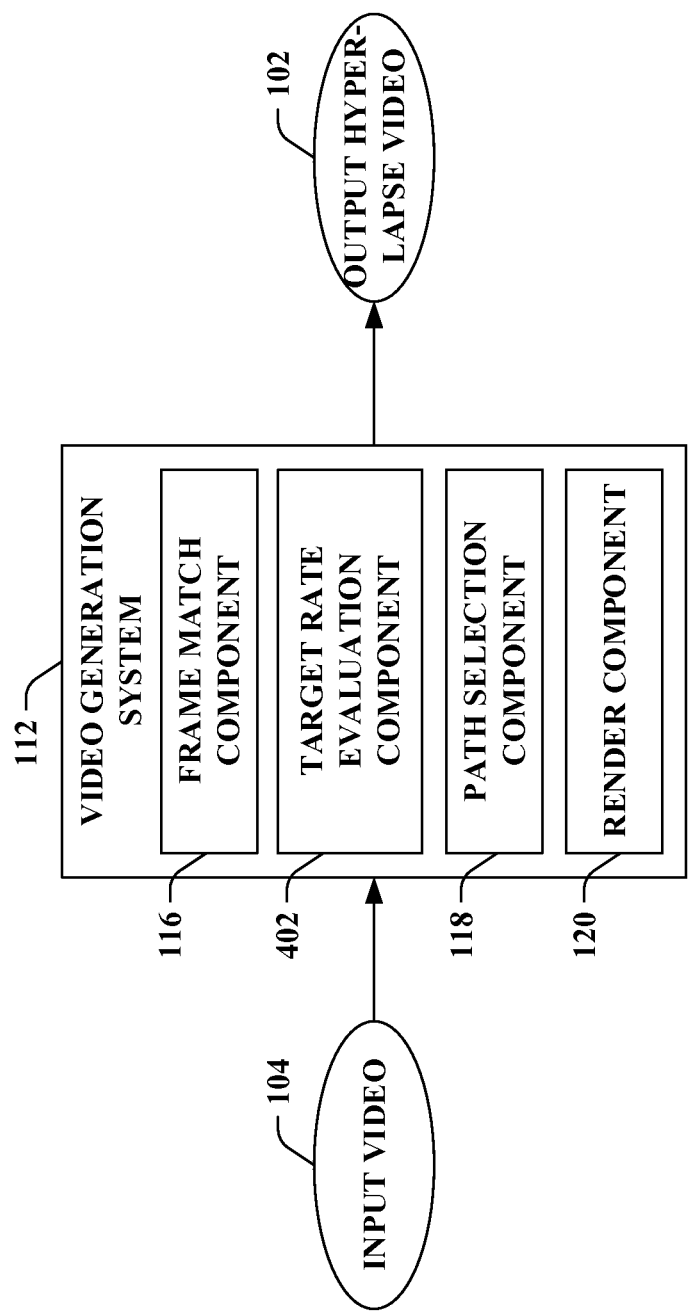
FIG. 4 illustrates a functional block diagram of the video generation system in accordance with various examples.

With reference to FIG. 4, illustrated is the video generation system 112 in accordance with various examples. The video generation system 112 again can include the frame match component 116, the path selection component 118, and the render component 120. Moreover, the video generation system 112 can generate the output hyper-lapse video 102 from the input video 104.

The video generation system 112 can further include a target rate evaluation component 402 configured to compute the target frame speed-up rate over the frames of the input video 104 based on camera velocity for the frames of the input video 104. The temporally varying target frame speed-up rate can be used to reduce variation in camera velocity in the output hyper-lapse video 102. Moreover, the temporally varying target frame speed-up rate can be utilized to slow lateral swings of the camera. Accordingly, the temporally varying target frame speed-up rate can be utilized to generate an equal motion output hyper-lapse video (e.g., the output hyper-lapse video 102).

The cost that penalizes deviating from the target frame speed-up rate can be modified to be based on the temporally varying target frame speed-up rate, v(i):

$$C_s(i,j,v(i))=\min(\|(j-i)-v(i)\|^2, \tau_s)$$

v(i) is a function of the camera velocity in the input video 104. The target rate evaluation component 402 can estimate this velocity in pixel space by sampling optical flow induced by the frame-to-frame transformations in the input sequence. Given the transformations T(i,j) as described above, the camera velocity for a frame i can be an average flow of four corners of a frame:

$$v(i) = \frac{1}{n}\sum_{p=1}^{n} \|T(i, i+1)(x_p, y_p)_i^T - (x_p, y_p)_i^T\|$$

In the foregoing, $(x_v, y_p) \in \{(1,1), (1,h), (w,1), (w,h)\}$, where w and h are the frame width and height, respectively.

According to an example, the temporally varying target frame speed-up rate can be computed by the target rate evaluation component 402 as follows:

$$v(i) = \propto v\left(\frac{\frac{1}{T}\sum_{i=1}^{T} v(i)}{v(i)}\right) + (1-\propto)v$$

The foregoing function can compute a speed-up rate at frame i that results in a camera velocity that is v times the average camera velocity. ∝ can be used to balance between equal motion and equal time results. According to an example, ∝=0.8 can be used; however, the claimed subject matter is not so limited.

According to another example, the frame match component 116 can further be configured to compute a given feature-based transformation between a given pair of frames by chaining two or more disparate feature-based transformations between disparate pairs of frames. Computing the transformations T(i,j) can be computationally expensive. Moreover, the computational expense can increase as the cost matrix window w increases (e.g., since w transformations can be computed per input frame). Thus, the frame match component 116 can approximate a subset of the transformations T(i,j) by chaining transformations as follows:

$$T(i,j)=T(i,i+1)T(i+1,i+2) \ldots T(j-1,j)$$

Such approximation may be more effective when chaining a relatively small number of transformations, since the approximation may drift over larger chains.

By way of another example, the frame match component 116 can be configured to use a combination of chained and directly computed transformations T(i,j). Accordingly, the frame match component 116 can determine whether to chain or directly compute the transformation. For instance, such determination can be based on a heuristic that estimates the drift. As an illustration, the overlap cost $C_o(i,j)$ can be computed using the chained approximation. If $C_o(i,j) \leq 0.05d$, where d is the image diagonal, then the chain-computed cost can be used. Alternatively, if $C_o(i,j) > 0.05d$, then the frame match component 116 can compute T(i,j) directly and recompute $C_o(i,j)$. Pursuant to another example, transformations can be computed at fixed spacings (e.g., 2×, 4×, etc.) and chaining can be used upon such transformations.

Figure 5:
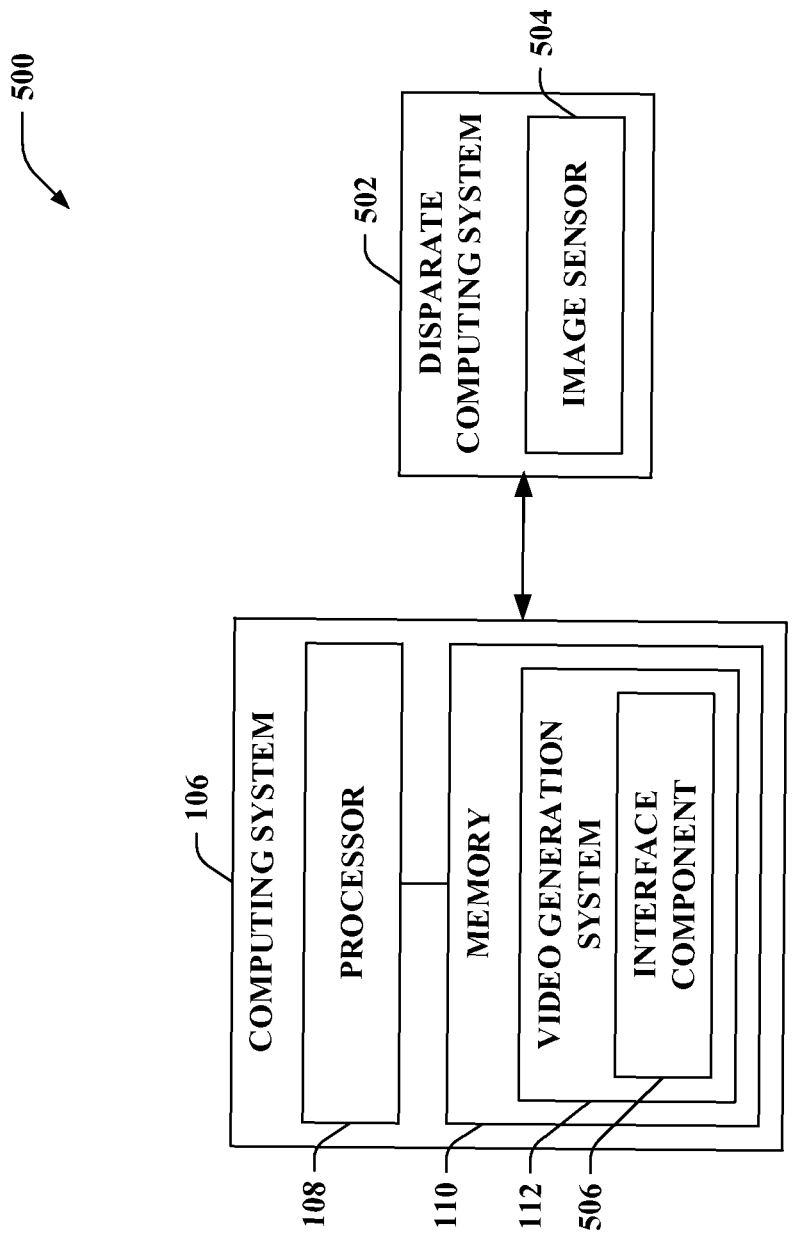
FIG. 5 illustrates a functional block diagram of another exemplary system that generates an output hyper-lapse video from an input video.

Turning to FIG. 5, illustrated is a system 500 that generates an output hyper-lapse video from an input video. The system 500 includes the computing system 106, which further includes the one or more processors 108 and the memory 110. As set forth herein, the memory 110 can include the video generation system 112 (or a portion thereof). Although not shown, it is contemplated that the computing system 106 can further include the data store 114.

The system 500 further includes a disparate computing system 502 that is in communication with the computing system 106. The disparate computing system 502 can communicate with the computing system 106 via a wired or wireless connection. Additionally or alternatively, the disparate computing system 502 can be in communication with the computing system 106 by way of a network. By way of example, the network can be the Internet, a cellular network, a local area network, a combination thereof, or the like. Yet, it is contemplated that substantially any network type is intended to fall within the scope of the hereto appended claims. Pursuant to another example, the disparate computing system 502 can communicate with the computing system 106 via one or more intermediary computing systems (e.g., the disparate computing system 502 can communicate with an intermediary computing system and the intermediary computing system can communicate with the computing system 106).

The disparate computing system 502 includes an image sensor 504 that can be utilized to capture the input video. The image sensor 504 can be part of the disparate computing system 502, coupled to the disparate computing system 502, or the like. Although not shown, it is further contemplated that the disparate computing system 502 can include one or more processors and memory. The disparate computing system 502 can be configured to transmit the input video to the computing system 106.

The video generation system 112 can further include an interface component 506 configured to receive the input video captured by the image sensor 504 of the disparate computing system 502. For instance, the interface component 506 can receive the input video directly from the disparate computing system 502, by way of a network, via one or more intermediary computing systems, or the like. As described herein, the video generation system 112 can create the output hyper-lapse video from the input video.

The interface component 506 can further be configured to transmit the output-hyper lapse video to the disparate computing system 502 (and/or a differing computing system). Additionally or alternatively, the output hyper-lapse video generated by the video generation system 112 can be retained in a data store (e.g., the data store 114) of the computing system 106, played by the computing system 106, and so forth.

According to an example, the disparate computing system 502 can be a mobile computing device that includes the image sensor 504. Thus, the disparate computing system 502 can be moved through space over time to capture the input video using the image sensor 504. Examples of such a mobile computing device can include a camera (e.g., a first-person camera, a handheld camera, etc.), a laptop computing device, a mobile telephone, a tablet computing device, a wearable computing device, a handheld computing device, a portable gaming device, a personal digital assistance, or the like.

Pursuant to another example, it is contemplated that the disparate computing system 502 can include a portion of the video generation system 112. Thus, the video generation system 112 can be distributed across the disparate computing system 502 and the computing system 106. Accordingly, portions of the video generation system 112 can be implemented in various locations, which can enable reducing an amount of data transmitted over a network between the computing system 106 and the disparate computing system 502. By way of illustration, part of the processing can be performed on the disparate computing system 502 prior to uploading processed data to the computing system 106. The computing system 106, according to a further example, can receive input videos from a plurality of disparate computing systems (e.g., the disparate computing system 502 as well as one or more other computing systems similar to the disparate computing system 502).

By way of a further example, a desired target frame speed-up rate (or several target frame speed-up rates) for output hyper-lapse video(s) can be received by the video generation system 112 of FIG. 5. The input video can be read from a data store of the computing system 106 (e.g., the data store 114). For instance, the three stages of the hyper-lapse creation can be executed by the video generation system 112 as if the input video was coming from a live camera stream. The video generation system 112 can generate the hyper-lapse video(s) and save such video(s) to the data store of the computing system 106. Moreover, the cost matrix window parameter w can be set to be equal to two times the maximum target frame speed-up rate; however, the claimed subject matter is not so limited.

Figure 6:
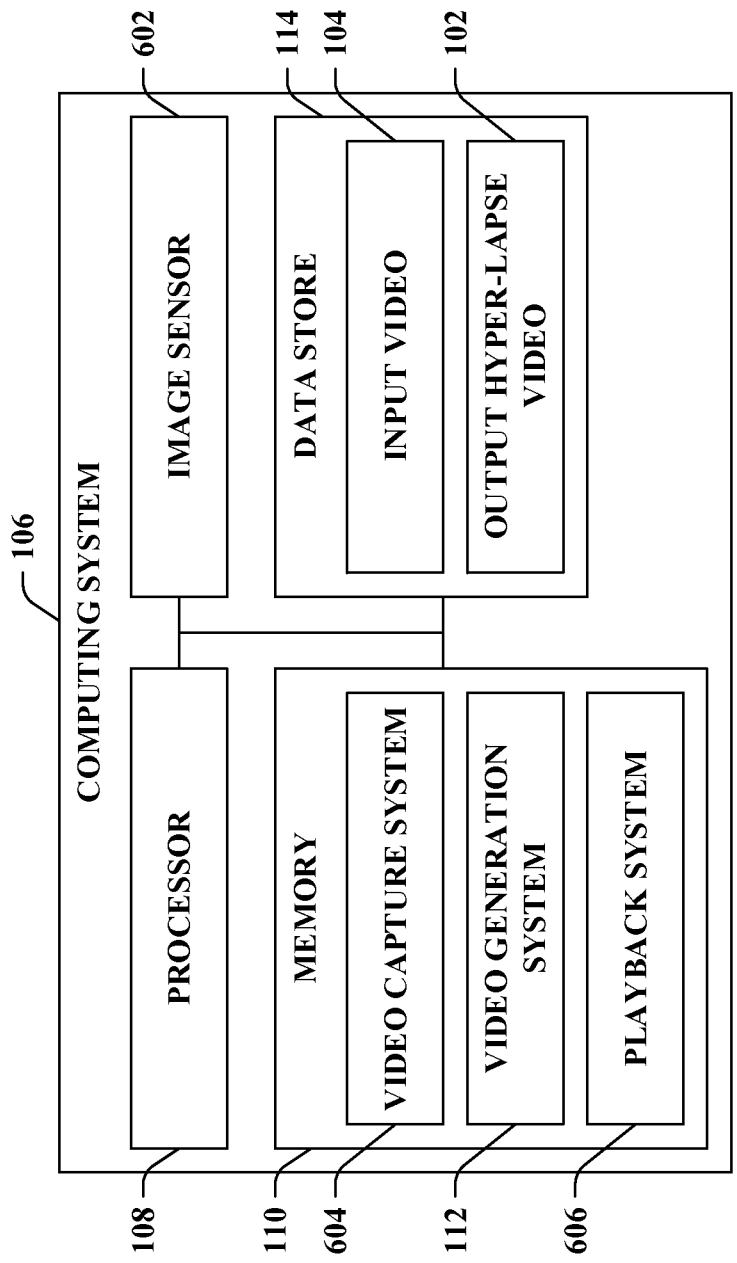
FIG. 6 illustrates a functional block diagram of an exemplary computing system that captures an input video and creates an output hyper-lapse video based on the captured input video.

Turning to FIG. 6, illustrated is an example of the computing system 106. Again, the computing system 106 can include the processor 108, the memory 110, and the data store 114.

In the example set forth in FIG. 6, the computing system 106 can be a mobile computing device that can be moved through space over time to capture the input video 104. More particularly, the computing system 106 can include an image sensor 602. Further, the memory 110 of the computing system 106 can include a video capture system 604 that is executable by the processor 108. The video capture system 604 can store output data from the image sensor 602 in the data store 114 as the input video 104.

The memory 110 of the computing system 106 further includes the video generation system 112. As set forth herein, the video generation system 112 can create the output hyper-lapse video 102 from the input video 104. Moreover, the video generation system 112 can store the output hyper-lapse video 102 in the data store 114.

Although not depicted, the video generation system 112 can include the frame match component 116, the path selection component 118, and the render component 120. According to an example, the frame match component 116 can be configured to compute the values of the overlaps between the pairs of the frames in the input video 104 concurrently while the video capture system 604 stores the output data from the image sensor 602 as the input video 104. Thus, frame matching and building of the cost matrix can occur during capture of the input video 104. After capture of the input video 104, the path selection component 118 can perform path selection to select the subset of the frames from the input video 104. Thereafter, the render component 120 can generate the output hyper-lapse video 102. For instance, the render component 120 can render the output hyper-lapse video 102 during interactive viewing, where input can be received (e.g., from a user, via an input component such as a touchscreen of the computing system 106, etc.) to control the speed-up for the rendered output hyper-lapse video 102.

The memory 110 of the computing system 106 can further include a playback system 606 that can play the output hyper-lapse video 102. For instance, the playback system 606 can display the output hyper-lapse video 102 on a display screen of or coupled with the computing system 106.

According to an example, the video generation system 112 can operate on live captures of the input video 104 by the image sensor 602. By way of another example, the video generation system 112 can operate on an imported input video 104. Pursuant to another example where the computing system 106 is a mobile computing device, the video generation system 112 can allow a discrete set of possible speed-up rates (e.g., 1×, 2×, 4×, 8×, 16×, and 32×) and a cost matrix window w can be set as 32. Following this example, the video generation system 112 can execute stage 1 during capture of the input video 104, stage 2 can be executed after capture, and stage 3 can be executed live during preview of the hyper-lapse video. Further, a slider can be used to interactively change the speed-up rate. However, it is to be appreciated that the claimed subject matter is not limited to the foregoing examples.

Figure 7:
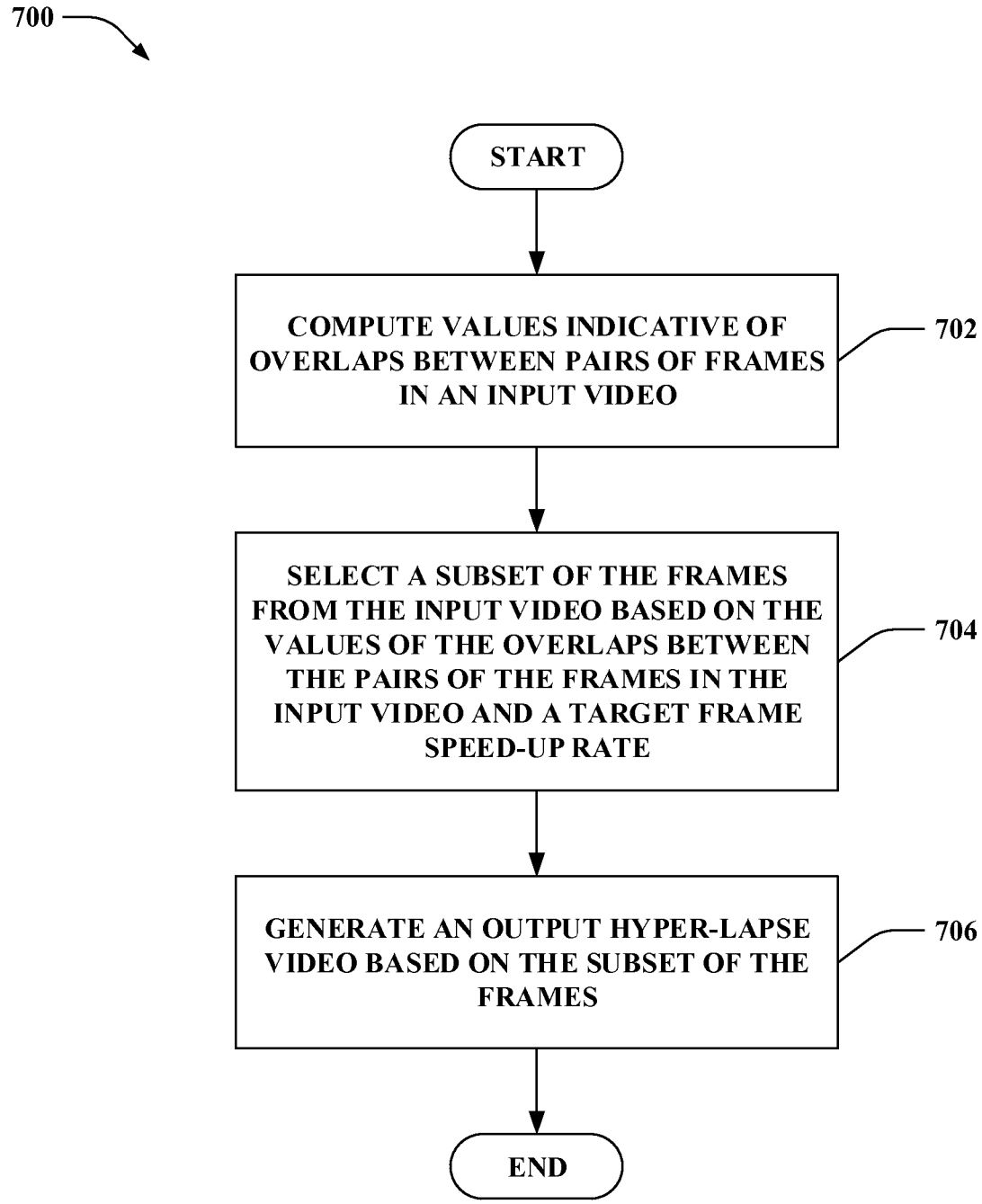
FIG. 7 is a flow diagram that illustrates an exemplary methodology of generating an output hyper-lapse video from an input video.

FIG. 7 illustrates an exemplary methodology relating to creating a hyper-lapse video. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Turning to FIG. 7, illustrated is a methodology 700 of generating an output hyper-lapse video from an input video. At 702, values indicative of overlaps between pairs of frames in an input video can be computed. According to an example, a value indicative of an overlap between a pair of frames can be computed based on a sparse set of points from each of the frames in the pair; however, the claimed subject matter is not so limited. At 704, a subset of the frames from the input video can be selected based on the values of the overlaps between the pairs of the frames in the input video and a target frame speed-up rate. The target frame speed-up rate can specify a value of X such that every Xth frame of the input video is desirably selected and remaining frames of the input video are desirably skipped. The target frame speed-up rate can differ from an actual frame speed-up rate over at least a portion of the subset of the frames selected from the input video. At 706, an output hyper-lapse video can be generated based on the subset of the frames. The output hyper-lapse video can be generated without a remainder of the frames of the input video other than the subset of frames.

Figure 8:
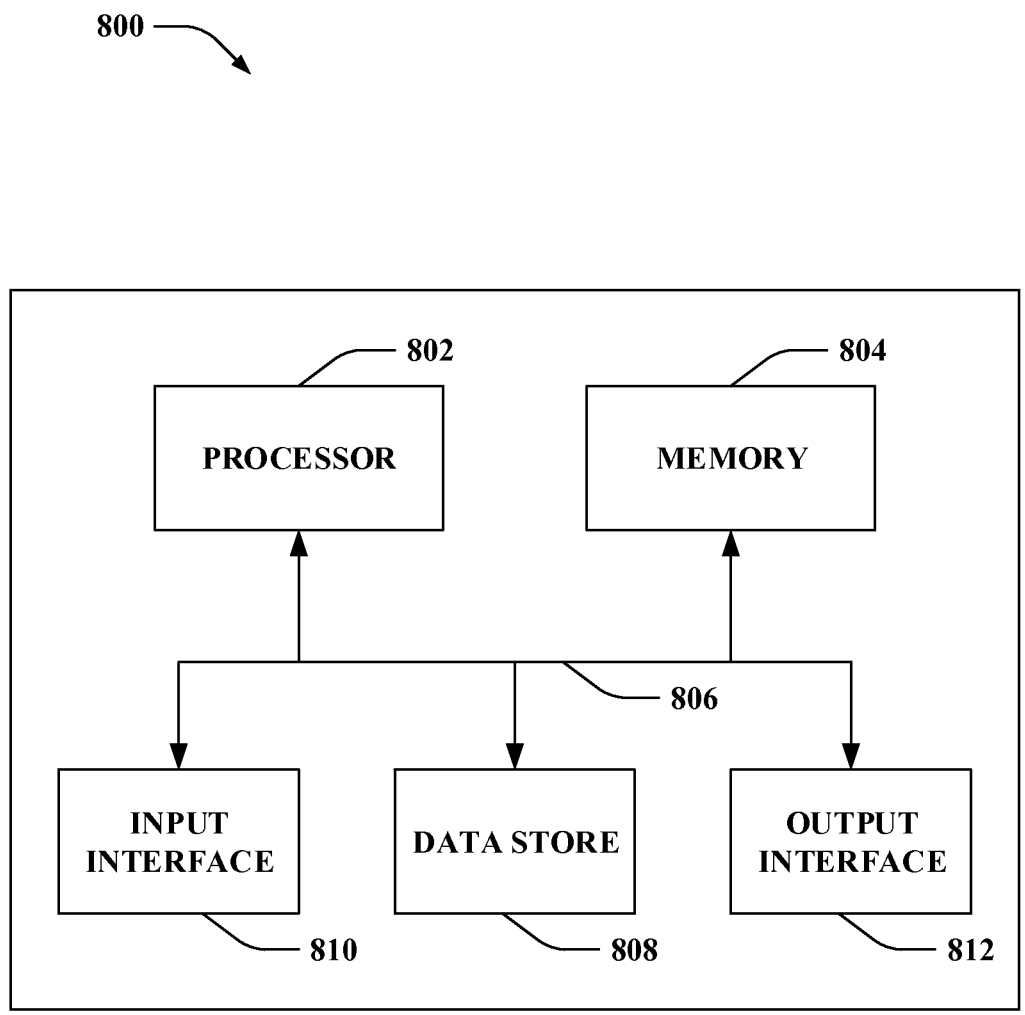
FIG. 8 illustrates an exemplary computing device.

Referring now to FIG. 8, a high-level illustration of an exemplary computing device 800 that can be used in accordance with the systems and methodologies disclosed herein is illustrated. For instance, the computing device 800 may be used in a system that generates an output hyper-lapse video from an input video. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store an input video, an output hyper-lapse video, a cost matrix, a trace-back matrix, and so forth.

The computing device 800 additionally includes a data store 808 that is accessible by the processor 802 by way of the system bus 806. The data store 808 may include executable instructions, an input video, an output hyper-lapse video, a cost matrix, a trace-back matrix, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

Figure 9:
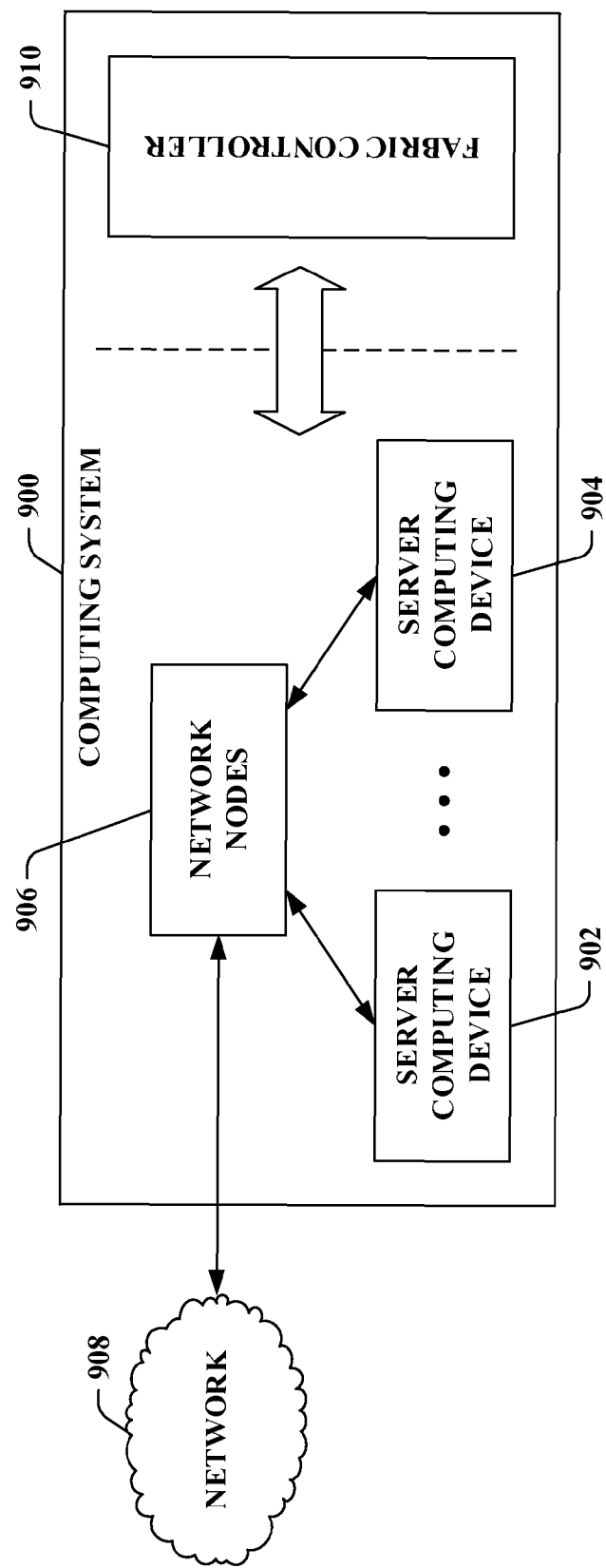
FIG. 9 illustrates an exemplary computing system.

Turning to FIG. 9, a high-level illustration of an exemplary computing system 900 that can be used in accordance with the systems and methodologies disclosed herein is illustrated. For instance, the computing system 900 can be or include the computing system 106. Additionally or alternatively, the computing system 106 can be or include the computing system 900.

The computing system 900 includes a plurality of server computing devices, namely, a server computing device 902, . . . , and a server computing device 904 (collectively referred to as server computing devices 902-904). The server computing device 902 includes at least one processor and a memory; the at least one processor executes instructions that are stored in the memory. The instructions may be, for instance, instructions for implementing functionality described as being carried out by one or more components discussed above or instructions for implementing one or more of the methods described above. Similar to the server computing device 902, at least a subset of the server computing devices 902-904 other than the server computing device 902 each respectively include at least one processor and a memory. Moreover, at least a subset of the server computing devices 902-904 include respective data stores.

Processor(s) of one or more of the server computing devices 902-904 can be or include the processor 108. Further, a memory (or memories) of one or more of the server computing devices 902-904 can be or include the memory 110. Moreover, a data store (or data stores) of one or more of the server computing devices 902-904 can be or include the data store 114.

The computing system 900 further includes various network nodes 906 that transport data between the server computing devices 902-904. Moreover, the network nodes 902 transport data from the server computing devices 902-904 to external nodes (e.g., external to the computing system 900) by way of a network 908. The network nodes 902 also transport data to the server computing devices 902-904 from the external nodes by way of the network 908. The network 908, for example, can be the Internet, a cellular network, or the like. The network nodes 906 include switches, routers, load balancers, and so forth.

A fabric controller 910 of the computing system 900 manages hardware resources of the server computing devices 902-904 (e.g., processors, memories, data stores, etc. of the server computing devices 902-904). The fabric controller 910 further manages the network nodes 906. Moreover, the fabric controller 910 manages creation, provisioning, de-provisioning, and supervising of virtual machines instantiated upon the server computing devices 902-904.

Various examples are now set forth.

Example 1

A computing system, comprising: at least one processor; and memory comprising a video generation system configured to create an output hyper-lapse video from an input video, the video generation system being executable by the at least one processor, the video generation system comprising: a frame match component configured to compute values indicative of overlaps between pairs of frames in the input video, a value indicative of an overlap between a pair of frames being computed based on a sparse set of points from each of the frames in the pair; a path selection component configured to select a subset of the frames from the input video, the subset of the frames selected based on the values of the overlaps between the pairs of the frames in the input video and a target frame speed-up rate; and a render component configured to generate the output hyper-lapse video based on the subset of the frames, the output hyper-lapse video being generated without a remainder of the frames of the input video other than the subset of the frames.

Example 2

The computing system according to Example 1, the frame match component further configured to compute the value indicative of the overlap between the pair of the frames based on movement of the sparse set of points between the frames in the pair.

Example 3

The computing system according to any of Examples 1-2, further comprising: a data store; an image sensor; and the memory further comprises a video capture system that is executable by the at least one processor, the video capture system stores output data from the image sensor in the data store as the input video.

Example 4

The computing system according to Example 3, the frame match component further configured to compute the values indicative of the overlaps between the pairs of the frames in the input video concurrently while the video capture system stores the output data from the image sensor as the input video.

Example 5

The computing system according to any of Examples 1-4, the video generation system further comprising an interface component configured to receive the input video, the input video being captured by an image sensor of a disparate computing system.

Example 6

The computing system according to any of Examples 1-5, the render component further configured to perform video stabilization on the subset of the frames.

Example 7

The computing system according to any of Examples 1-6, the path selection component further configured to select the subset of the frames from the input video that optimize overlaps between adjacent frames in the output hyper-lapse video and costs due to variations from the target frame speed-up rate.

Example 8

The computing system according to any of Examples 1-7, the path selection component further configured to select the subset of the frames from the input video based on an acceleration penalty value that penalizes changes in an actual frame speed-up rate over the subset of the frames selected from the input video.

Example 9

The computing system according to any of Examples 1-8, the target frame speed-up rate specifies a value of X such that every Xth frame of the input video is desirably selected and remaining frames of the input video are desirably skipped.

Example 10

The computing system according to Example 9, the path selection component further configured to select the subset of the frames from the input video that optimize overlaps between adjacent frames in the output hyper-lapse video, costs due to variations from the target frame speed-up rate, and costs due to changes in an actual frame speed-up rate over the subset of the frames selected from the input video.

Example 11

The computing system according to any of Examples 1-10, the target frame speed-up rate differs from an actual frame speed-up rate over at least a portion of the subset of the frames selected from the input video.

Example 12

The computing system according to any of Examples 1-11, the frame match component further configured to:

compute feature-based transformations between the pairs of the frames in the in the input video; align the pairs of the frames based on the feature-based transformations; and compute the values indicative of the overlaps between the pairs of the frames in the input video as aligned.

Example 13

The computing system according to Example 12, the frame match component further configured to compute a given feature-based transformation between a given pair of frames by chaining two or more disparate feature-based transformations between disparate pairs of frames.

Example 14

The computing system according to any of Examples 1-13, the video generation system further comprising a target rate evaluation component configured to compute the target frame speed-up rate over the frames of the input video based on camera velocity for the frames of the input video.

Example 15

The computing system according to any of Examples 1-14, the pairs of the frames in the input video for which the values indicative of the overlaps are computed comprise particular pairs of frames having less than or equal to a maximum permitted frame separation in the input video and exclude remaining pairs of frames having greater than the maximum permitted frame separation in the input video.

Example 16

A method of generating an output hyper-lapse video from an input video, comprising: computing values indicative of overlaps between pairs of frames in the input video; selecting a subset of the frames from the input video based on: the values of the overlaps between the pairs of the frames in the input video; and a target frame speed-up rate, the target frame speed-up rate specifies a value of X such that every Xth frame of the input video is desirably selected and remaining frames of the input video are desirably skipped, the target frame speed-up rate differs from an actual frame speed-up rate over at least a portion of the subset of the frames selected from the input video; and generating the output hyper-lapse video based on the subset of the frames, the output hyper-lapse video being generated without a remainder of the frames of the input video other than the subset of the frames.

Example 17

The method according to Example 16, further comprising computing the values indicative of the overlaps between the pairs of the frames in the input video based on sparse sets of points from the frames in the pairs.

Example 18

The method according to any of Examples 16-17, selecting the subset of the frames from the input video further based on an acceleration penalty value that penalizes changes in the actual frame speed-up rate over the subset of the frames selected from the input video.

Example 19

The method according to any of Examples 16-18, selecting the subset of the frames from the input video further comprises optimizing overlaps between adjacent frames in the output hyper-lapse video, costs due to variations from the target frame speed-up rate, and costs due to changes in the actual frame speed-up rate over the subset of the frames selected from the input video.

Example 20

A computing system, comprising: at least one processor; and memory comprising a video generation system configured to create an output hyper-lapse video from an input video, the video generation system being executable by the at least one processor, the video generation system comprising: a frame match component configured to compute values indicative of overlaps between pairs of frames in the input video; a path selection component configured to select a subset of the frames from the input video, the subset of the frames selected based on the values of the overlaps between the pairs of the frames in the input video, a target frame speed-up rate, and an acceleration penalty value that penalizes changes in an actual frame speed-up rate over the subset of the frames selected from the input video; and a render component configured to generate the output hyper-lapse video based on the subset of the frames, the output hyper-lapse video being generated without a remainder of the frames of the input video other than the subset of the frames.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing system, comprising:
   at least one processor; and
   memory that comprises computer-executable instructions that, when executed by the at least one processor, cause the at least one processor to perform acts including:
   computing values indicative of overlaps between pairs of frames in an input video, a value indicative of an overlap between a pair of frames being computed based on a sparse set of points from each of the frames in the pair;
   selecting a subset of the frames from the input video, the subset of the frames selected based on the values of the overlaps between the pairs of the frames in the input video and a target frame speed-up rate; and
   generating an output hyper-lapse video based on the subset of the frames, the output hyper-lapse video being generated without a remainder of the frames of the input video other than the subset of the frames.

2. The computing system of claim 1, the memory further comprises computer-executable instructions that, when executed by the at least one processor, cause the at least one processor to perform acts including:
   computing the value indicative of the overlap between the pair of the frames based on movement of the sparse set of points between the frames in the pair.

3. The computing system of claim 1, further comprising:
   a data store;
   an image sensor; and
   the memory further comprises computer-executable instructions that, when executed by the at least one processor, cause the at least one processor to perform acts including:
   storing output data from the image sensor in the data store as the input video.

4. The computing system of claim 3, the memory farther comprises computer-executable instructions that, when executed by the at least one processor, cause the at least one processor to perform acts including:
   computing the values indicative of the overlaps between the pairs of the frames in the input video concurrently while the output data from the image sensor is stored as the input video.

5. The computing system of claim 1, the memory further comprises computer-executable instructions that, when executed by the at least one processor, cause the at least one processor to perform acts including:
   receiving the input video, the input video being captured by an image sensor of a disparate computing system.

6. The computing system of claim 1, the memory further comprises computer-executable instructions that, when executed by the at least one processor, cause the at least one processor to perform acts including:
   performing video stabilization on the subset of the frames.

7. The computing system of claim 1, the memory further comprises computer-executable instructions that, when executed by the at least one processor, cause the at least one processor to perform acts including:
   selecting the subset of the frames from the input video that optimize overlaps between adjacent frames in the output hyper-lapse video and costs due to variations from the target frame speed-up rate.

8. The computing system of claim 1, the memory further comprises computer-executable instructions that, when executed by the at least one processor, cause the at least one processor to perform acts including:
   selecting the subset of the frames from the input video based on an acceleration penalty value that penalizes changes in an actual frame speed-up rate over the subset of the frames selected from the input video.

9. The computing system of claim 1, the target frame speed-up rate specifies a value of X such that every Xth frame of the input video is desirably selected and remaining frames of the input video are desirably skipped.

10. The computing system of claim 9, the memory further comprises computer-executable instructions that, when executed by the at least one processor, cause the at least one processor to perform acts including:
    selecting the subset of the frames from the input video that optimize overlaps between adjacent frames in the output hyper-lapse video, costs due to variations from the target frame speed-up rate, and costs due to changes in an actual frame speed-up rate over the subset of the frames selected from the input video.

11. The computing system of claim 1, the target frame speed-up rate differs from an actual frame speed-up rate over at least a portion of the subset of the frames selected from the input video.

12. The computing system of claim 1, the memory further comprises computer-executable instructions that, when executed by the at least one processor, cause the at least one processor to perform acts including:
    computing feature-based transformations between the pairs of the frames in the in the input video;
    aligning the pairs of the frames based on the feature-based transformations; and
    computing the values indicative of the overlaps between the pairs of the frames in the input video as aligned.

13. The computing system of claim 12, the memory further comprises computer-executable instructions that, when executed by the at least one processor, cause the at least one processor to perform acts including:
    computing a given feature-based transformation between a given pair of frames by chaining two or more disparate feature-based transformations between disparate pairs of frames.

14. The computing system of claim 1, the memory further comprises computer-executable instructions that, when executed by the at least one processor, cause the at least one processor to perform acts including:
    computing the target frame speed-up rate over the frames of the input video based on camera velocity for the frames of the input video.

15. The computing system of claim 1, the pairs of the frames in the input video for which the values indicative of the overlaps are computed comprise particular pairs of frames having less than or equal to a maximum permitted frame separation in the input video and exclude remaining pairs of frames having greater than the maximum permitted frame separation in the input video.

16. A method of generating an output hyper-lapse video from an input video, comprising:
    computing values indicative of overlaps between pairs of frames in the input video, the values indicative of the overlaps between the pairs of the frames in the input video being computed based on sparse sets of points from the frames in the pairs;
    selecting a subset of the frames from the input video based on:
        the values of the overlaps between the pairs of the frames in the input video; and
        a target frame speed-up rate, the target frame speed-up rate specifies a value of X such that every Xth frame of the input video is desirably selected and remaining frames of the input video are desirably skipped, the target frame speed-up rate differs from an actual frame speed-up rate over at least a portion of the subset of the frames selected from the input video; and
    generating the output hyper-lapse video based on the subset of the frames, the output hyper-lapse video being generated without a remainder of the frames of the input video other than the subset of the frames.

17. The method of claim 16, selecting the subset of the frames from the input video further based on an acceleration penalty value that penalizes changes in the actual frame speed-up rate over the subset of the frames selected from the input video.

18. The method of claim 16, selecting the subset of the frames from the input video further comprises optimizing overlaps between adjacent frames in the output hyper-lapse video, costs due to variations from the target frame speed-up rate, and costs due to changes in the actual frame speed-up rate over the subset of the frames selected from the input video.

19. A computing system, comprising:
    at least one processor; and
    memory that comprises computer-executable instructions that, when executed by the at least one processor, cause the at least one processor to perform acts including:
        computing values indicative of overlaps between pairs of frames in an input video, a value indicative of an overlap between a pair of frames being computed based on a sparse set of points from each of the frames in the pair;
        selecting a subset of the frames from the input video, the subset of the frames selected based on the values of the overlaps between the pairs of the frames in the input video, a target frame speed-up rate, and an acceleration penalty value that penalizes changes in an actual frame speed-up rate over the subset of the frames selected from the input video; and
        generating an output hyper-lapse video based on the subset of the frames, the output hyper-lapse video being generated without a remainder of the frames of the input video other than the subset of the frames.

20. The computing system of claim 19, the target frame speed-up rate differs from the actual frame speed-up rate over at least a portion of the subset of the frames selected from the input video.

* * * * *